(12) United States Patent
Borsari et al.

(10) Patent No.: US 12,495,889 B2
(45) Date of Patent: *Dec. 16, 2025

(54) BRUSH ASSEMBLY AND METHOD OF MANUFACTURING A BRUSH

(71) Applicant: Sanderson-MacLeod, Inc., Palmer, MA (US)

(72) Inventors: Mark Borsari, Wilbraham, MA (US); Chris Tarling, Brooklyn, NY (US)

(73) Assignee: Sanderson-MacLeod, Inc., Palmer, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,363

(22) Filed: Nov. 21, 2023

(65) Prior Publication Data

US 2024/0081517 A1 Mar. 14, 2024

Related U.S. Application Data

(63) Continuation of application No. 17/691,425, filed on Mar. 10, 2022, now Pat. No. 11,857,065, which is a continuation of application No. 16/817,973, filed on Mar. 13, 2020, now Pat. No. 11,304,505.

(60) Provisional application No. 62/825,286, filed on Mar. 28, 2019, provisional application No. 62/817,701, filed on Mar. 13, 2019.

(51) Int. Cl.
| | | |
|---|---|---|
| A46B 5/00 | (2006.01) |
| A45D 40/26 | (2006.01) |
| A46B 7/04 | (2006.01) |
| A46B 7/08 | (2006.01) |
| A46B 9/02 | (2006.01) |
| A46D 1/00 | (2006.01) |
| A46D 3/00 | (2006.01) |

(52) U.S. Cl.
CPC .......... *A46B 5/0037* (2013.01); *A45D 40/265* (2013.01); *A46B 5/0095* (2013.01); *A46B 7/044* (2013.01); *A46B 7/08* (2013.01); *A46B 9/021* (2013.01); *A46B 9/025* (2013.01); *A46B 9/026* (2013.01); *A46D 1/0207* (2013.01); *A46D 3/00* (2013.01); *A46B 2200/1053* (2013.01); *A46B 2200/106* (2013.01)

(58) Field of Classification Search
CPC .... A46D 34/04; A46D 34/042; A46D 34/045; A46D 40/265; A46B 7/044; A46B 9/021; A46B 9/025; A46B 9/026; A46B 5/0037
See application file for complete search history.

(56) References Cited

U.S. PATENT DOCUMENTS

| | | | | |
|---|---|---|---|---|
| 2,496,010 A | * | 1/1950 | Lotters | A46B 15/00 |
| | | | | 15/201 |
| 10,463,142 B2 | * | 11/2019 | Borsari | F41A 29/02 |
| 2008/0245385 A1 | * | 10/2008 | Schrepf | A46B 9/021 |
| | | | | 15/207.2 |

* cited by examiner

*Primary Examiner* — Shay Karls
(74) *Attorney, Agent, or Firm* — Grogan, Tuccillo & Vanderleeden, LLP

(57) ABSTRACT

A method of manufacturing a brush includes providing a core wire section having a proximal end and a distal end, and an integral tip on the distal end, forming a bristle element having a throughbore, and inserting the core wire section into the throughbore until the bristle element is received on the core wire section.

13 Claims, 12 Drawing Sheets

BRUSH ASSEMBLY AND METHOD OF MANUFACTURING A BRUSH

CROSS-REFERENCE TO RELATED APPLICATIONS

This application is a continuation application of U.S. patent application Ser. No. 17/691,425 (now U.S. Pat. No. 11,857,065), filed on Mar. 10, 2022, which is a continuation application of U.S. patent application Ser. No. 16/817,973 (now U.S. Pat. No. 11,304,505), filed on Mar. 13, 2020, which claims the benefit of U.S. Provisional Application Ser. No. 62/817,701, filed on Mar. 13, 2019, and U.S. Provisional Application Ser. No. 62/825,286, filed on Mar. 28, 2019, each of which are hereby incorporated by reference herein in their entireties.

FIELD OF THE INVENTION

The present invention relates generally to brushes and, more particularly, to a brush having a twisted wire core and a method of shaping or forming a brush having a twisted wire core.

BACKGROUND OF THE INVENTION

Brushes have long been used for a variety of purposes including, for example, cleaning the interior surfaces of vessels and tubular bodies, collecting biological specimens or samples and applying personal care product compositions such as mascara. With particular respect to brushes used for the application of mascara to a user's eyelashes, such a brush must be capable of picking up and transporting a supply of mascara from a reservoir and depositing it on a user's eyelashes. In addition, such a brush must also be capable of combing out clumps of excess mascara and separating lashes so that the mascara may be applied evenly.

One known type of mascara brush is the twisted in wire brush, which typically comprises a core formed from a single metallic wire folded in a generally u-shaped configuration to provide a pair of parallel wire segments. Bristles (also referred to as filaments or fibers), usually comprised of strands of nylon, are disposed between a portion of a length of the wire segments. The wire segments are then twisted, or rotated, about each other to form a helical core (also known as a twisted wire core) which holds the filaments substantially at their midpoints so as to clamp them. In this way, a bristle portion or bristle head is formed with radially extending bristles secured in the twisted wire core in a helical or spiral manner. This construction method is well suited for forming a typical bristle type of applicator (i.e., a twisted wire core brush) having uniform bristle characteristics along the length of the brush. However, it is not well suited for consistently forming brushes with bristle characteristics that vary at regular or irregular intervals along the length of the brush.

Another known type of mascara brush is the disc-array or stacked-disc applicator brush, which typically includes an array of flexible discs that are disposed in an axial array along a rod-like wand or central shaft. The discs can be formed individually in a variety of configurations, and assembled in a variety of combinations to yield applicators having different characteristics. The central shaft of such brushes is typically formed from a polymer or plastic, such as by molding. Such disc-array applicator brushes, however, cannot be shaped or trimmed after assembly in the manner that traditional fiber brushes can, thereby limiting the ability for brush customization.

In view of the above, there is a need for brush assemblies or brush constructions that combine the benefits of known twisted-in-wire brushes and stacked disc array brushes, that provide a wider array of shapes and configurations than currently exist in the art, and/or which are easy to manufacture.

SUMMARY OF THE INVENTION

In view of the foregoing, it is an object of the present invention to provide a brush.

It is another object of the present invention to provide a stacked-disc brush.

It is another object of the present invention to provide a stacked-disc brush having an integral tip.

It is another object of the present invention to provide a stacked-disc brush that can be shaped, trimmed or deformed like traditional fiber brushes.

It is yet another object of the present invention to provide a brush having a twisted wire core and a molded or additively manufactured bristle element received on the wire core.

According to an embodiment of the present invention, a brush includes a core section having a proximal end and a distal end, and an integral tip formed on the distal end, and at least one bristle element slidably received on the core section.

According to another embodiment of the invention, a method of manufacturing a brush includes the steps of providing a core section having a proximal end and a distal end, and an integral tip on the distal end, and positioning at least one bristle element on the core section, the at least one bristle element having a throughbore through which the core section extends. The integral tip forms a position stop preventing the at least one bristle element from sliding off the distal end of the core section.

According to another embodiment of the present invention, a brush includes a core section having a plurality of leg portions twisted in a helical configuration, and a plurality of fiber bristles anchored between the plurality of leg portions, and a plurality of disc elements received on the core section. The plurality of fiber bristles are configured such that the plurality of fiber bristles interact with the plurality of disc elements to inhibit rotation of the plurality of disc elements relative to the core section.

According to yet another embodiment of the present invention, a brush includes a core wire section having a proximal end and a distal end, and a plurality of discs received on the core wire section, the plurality of discs defining a brush head. The brush head is shaped by at least one of trimming the plurality of discs of the brush head and/or bending a portion of the core wire section.

According to yet another embodiment of the present invention, a method of manufacturing a brush includes the steps of providing a core section having a proximal end and a distal end, positioning at least one bristle element on the core section, and at least one of trimming the at least one bristle element to shape after positioning the at least one bristle element on the core section and/or bending the core section after positioning the at least one bristle element on the core section.

According to yet another embodiment of the present invention, a method of manufacturing a brush includes the steps of providing a core section having a proximal end and a distal end, positioning a plurality of disc elements on the core section in stacked relationship, and at least one of bending the core section after positioning the plurality of disc elements on the core section and trimming at least a subset of the plurality of disc elements after positioning the plurality of disc elements on the core section.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
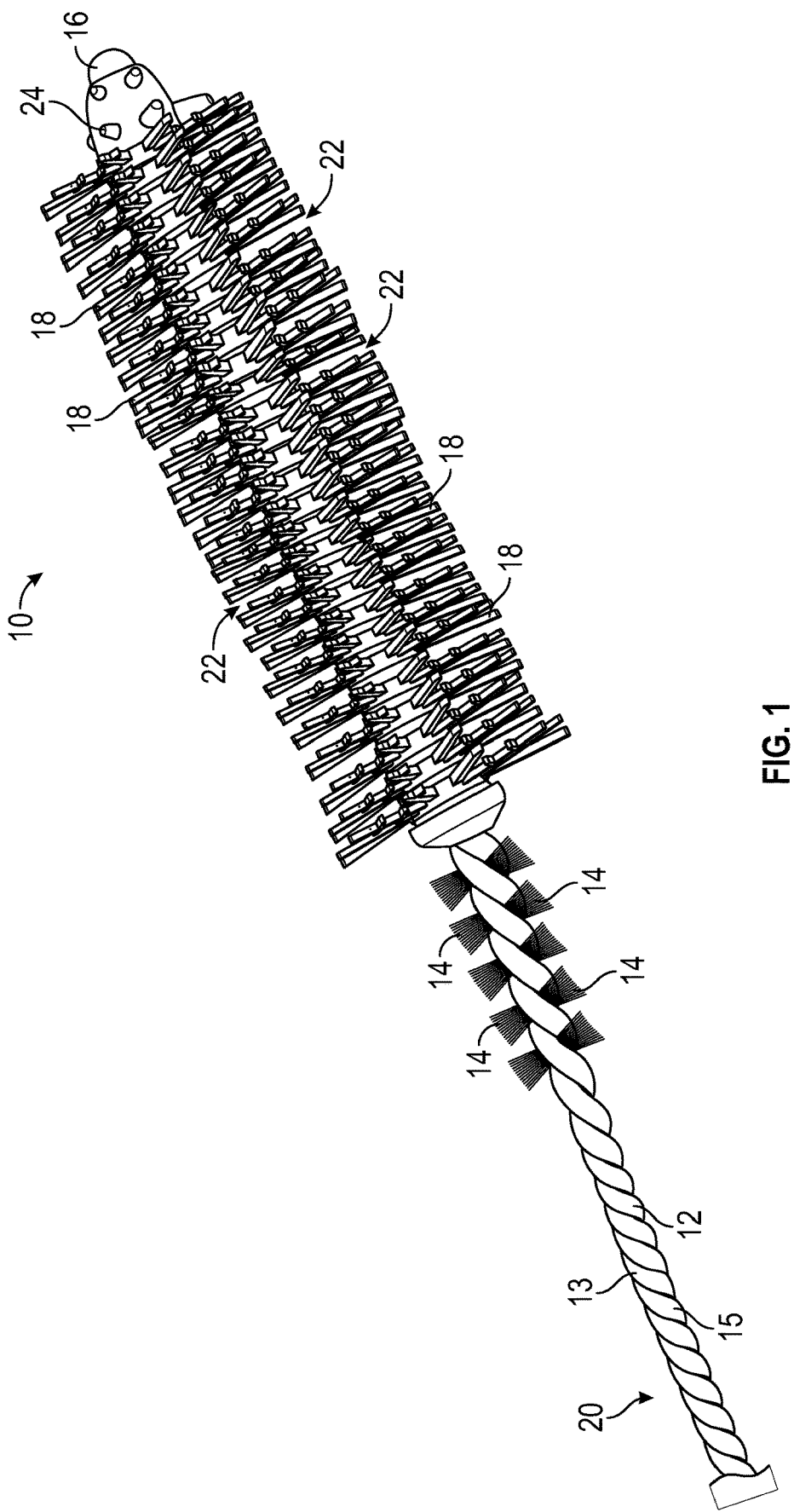
FIG. 1 is a perspective view of a stacked-disc brush according to an embodiment of the present invention.

Referring to FIG. 1, a brush assembly 10, also referred to herein as brush 10, according to an embodiment of the present invention is illustrated. As shown therein, the brush 10 includes a core wire section 12 having a plurality of fibers or bristles 14 secured by the core wire section 12 and extending radially therefrom, and a spherical or substantially round or ball-shaped tip 16 integrally formed with the core wire section 12 at a distal end thereof (such that the core wire section 12 and the tip 1 form a unitary part). The brush 10 further includes an array of disc elements, e.g., discs 18 that are slidably received on the core wire section 12. As discussed hereinafter, the discs 18 are retained on the core wire section 12 by the spherical tip 16, which has an enlarged diameter with respect to a central aperture or throughbore 17 of the discs 18 that receive the core wire section 12. In embodiment, the brush 10 may also include a handle (not shown) secured to the core wire section 12 at a proximal end 20 opposite the tip 16 for allowing a user to grasp and manipulate the brush 10. In certain embodiments, an integral, spherical tip (not shown) may likewise be formed on the proximal end 20 of the brush 10, opposite the tip 16.

In an embodiment, the core wire section 12 and the integral tip 16 may be fabricated in the manner disclosed in U.S. Pat. Nos. 8,850,650 and 8,783,787, which are hereby incorporated by reference herein in their entireties. In particular, the core wire section 12 is preferably formed from a pliable metallic wire that is reversibly folded back upon itself to form two generally coextensive leg portions 13, 15, which are then twisted in a helical configuration to retain the bristles 14 therein and to cause the bristles 14 to fan radially outward (in a helical orientation) from the core wire section 12 to form a bristle block. In an embodiment, the core wire section 12 may be comprised of nickel alloys, titanium alloys, stainless steel alloys, carbon steel alloys, cobalt alloys or aluminum alloys, although other metals or metal alloys may be used without departing from the scope of the present invention. While this is an exemplary method of forming a twisted in wire brush, it will be readily appreciated that any fabrication process or method for forming twisted in wire brushes known in the art may be employed, without departing from the scope of the present invention. For example, it will be readily appreciated that a plurality of wires may be used in place of the single wire described above. In such a situation, the plurality of wires may be placed adjacent one another, a plurality of bristles placed between the wires, and the wires twisted together to form a core of helical configuration and to anchor the bristles in place. Other methods and configurations of forming wire brushes and twisted in wire brushes are known in the art and may be incorporated in the current design without departing from the scope of the present invention.

As disclosed above, the distal end of the core wire section 12 is formed with an integral, substantially spherical tip or ball 16 that defines a position stop or anchoring point for the individual disc 18, as discussed hereinafter. The integral tip 16 may be formed on the distal end of the wire core by melting or welding only the distal end of the core section 12 after twisting of the core 12, as disclosed in U.S. Pat. Nos. 8,850,650 and 8,783,787. For example, to form the smooth and substantially rounded ball 16 on the distal end of the core wire section 12, the high-energy fusion welding may be used to "melt" the core sire section 12 of the brush 10 at the distal end thereof.

Importantly, the core wire section 12 and the integral tip 16 are homogeneous, in that the tip 16 is made of existing material from the core wire section 12 without the addition of any other quantity of material. The tip 16, is therefore made to be consistent, smooth and inseparable from the core wire section 12. Melting the distal end of the core wire section 12 also melts and eliminates any sharp or uneven edges, and eliminates any contaminant trapping voids that may be present. Once fused, the coextensive leg portion of the wire core are unable to be separated from one another, and the rounded tip is also inseparable from the core wire section 12. Importantly, welding or melting of the distal end of the core wire section 12 results in a metallurgical bond between the enlarged tip 16 and the core wire section 12 of the brush 10, which increases the structural strength of the brush itself and aids substantially in ensuring that the leg portions of the core wire section 12 do not become unraveled.

Specific welding technologies such as Laser, Gas Tungsten Arc Welding (GTAW), Plasma Arc Welding and Electron Beam Welding may be used to melt/weld the distal end of the core wire section 12 to form the spherical tip 16. In particular, the preferred parameter range is 0.001 Milliamps to 200 Amps for Gas Tungsten Arc Welding, 15 Kv-200 Kv for Electron Beam Welding and 1 Amp-200 Amps for Plasma Arc Welding, although other parameters may be used. For Laser technology, near ultra violet and/or near infra-red laser sources are preferred, although other wavelengths may be used to achieve the objects of the present invention. While the embodiments described herein disclose a spherical tip, in certain embodiments, the tip may be generally spherical (i.e., not entirely spherical).

Figure 2:
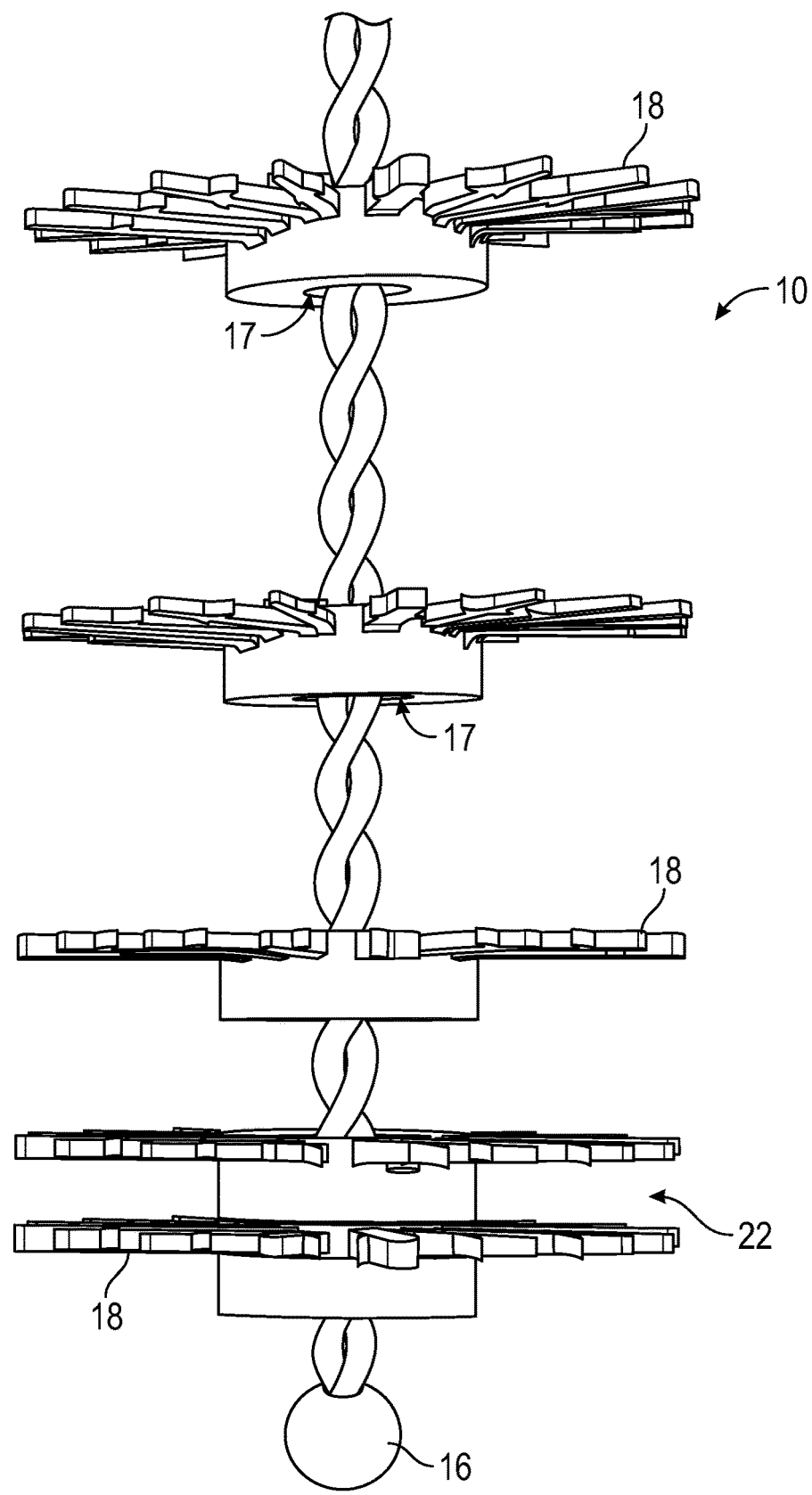
FIG. 2 is a perspective view of illustrating the assembly of individual discs on the core wire section of the stacked-disc brush of FIG. 1.

With reference to FIG. 2, once the core wire section 12 is formed and twisted to retain the bristles, and the homogeneous, integral tip 16 is formed on the distal end thereof, the bristles 14 may be trimmed to a desired shape. In an embodiment, the bristles 14 may be trimmed prior to forming the tip 16. In an embodiment, the bristles 14 extend radially from the core wire section 12 by an extent/distance that is greater than a radius of the central aperture 17 of the discs 17 (which may be achieved through trimming or through selection of bristles of a particular length). In particular, the bristle block formed by the radially-extending and/or helically-extending bristles 14 has a diameter that is greater than a diameter of the central aperture 17 of the discs 18, the purposes of which will be disclosed hereinafter.

The core wire section 12 is then inverted and the individual discs 18 may be slid onto the core wire section 12 from the handle end 20 until they abut the enlarged tip 16, which serves as a position stop preventing the discs 18 from sliding off the core wire section 12. A handle (not shown) may be subsequently molded or otherwise attached to the core wire section at the handle end 20 to retain the discs on the core wire section 12 and prevent them from sliding off the core wire section 12 at the handle end 20. In yet other embodiments, it is contemplated that the discs 18 may be placed onto the core wire section 12 prior to forming the integral tip 16.

Importantly, the bristles 14 that extend from the core wire section 12 frictionally engage the central aperture 17 of the discs 18, inhibiting rotation of the discs 18 with respect to the core wire section 12. In this respect, the bristles 14 may be retained within the core wire section 12 over a longitudinal extent of the core wire section 12 that generally corresponds to the longitudinal positioning of the discs 18. For example, the bristles block formed by the bristles 14 may extend from a point closer to the proximal end 20 than the proximal-most disc 18, to a point closer to the tip 16 than the distal-most disc 18. The bristles 14, therefore, provide for a type of anti-rotation feature that improves the function of the brush 10. In addition, the helical configuration of the bristles 14 forms a structure similar to a screw thread that inhibits or prevents axial movement of the discs 18 on the core wire section 12 (i.e., the screw thread-like configuration of the bristles 14 resists axial movement of the discs 18 along the core wire section 12. This helps retain the discs 18 in desired position on the core wire section 12.

In an embodiment, the discs 18 may be formed from any semi-rigid or rigid material such as, for example, elastomers, plastics such as styrene, acetal, polyethylene, polypropylene, nylon, polyvinyl chloride, polyethylene terephthalate, polycarbonate, acrylic, and the like, rubber, silicone, nylon or the like, or metals, such as, for example, aluminum and stainless steel. The durometer of the disc material may be varied based on desired performance characteristics of the discs. As indicated above, each independent disc 18 has a central aperture through which the proximal end 20 of the core wire section 12 is slidably disposed. Each disc 18 has an upper surface and a lower surface so that, when the discs are aligned in the array, the upper surface of one disc faces the lower surface of the next successive disc within the array and defines a space 22 therebetween.

Figure 19:
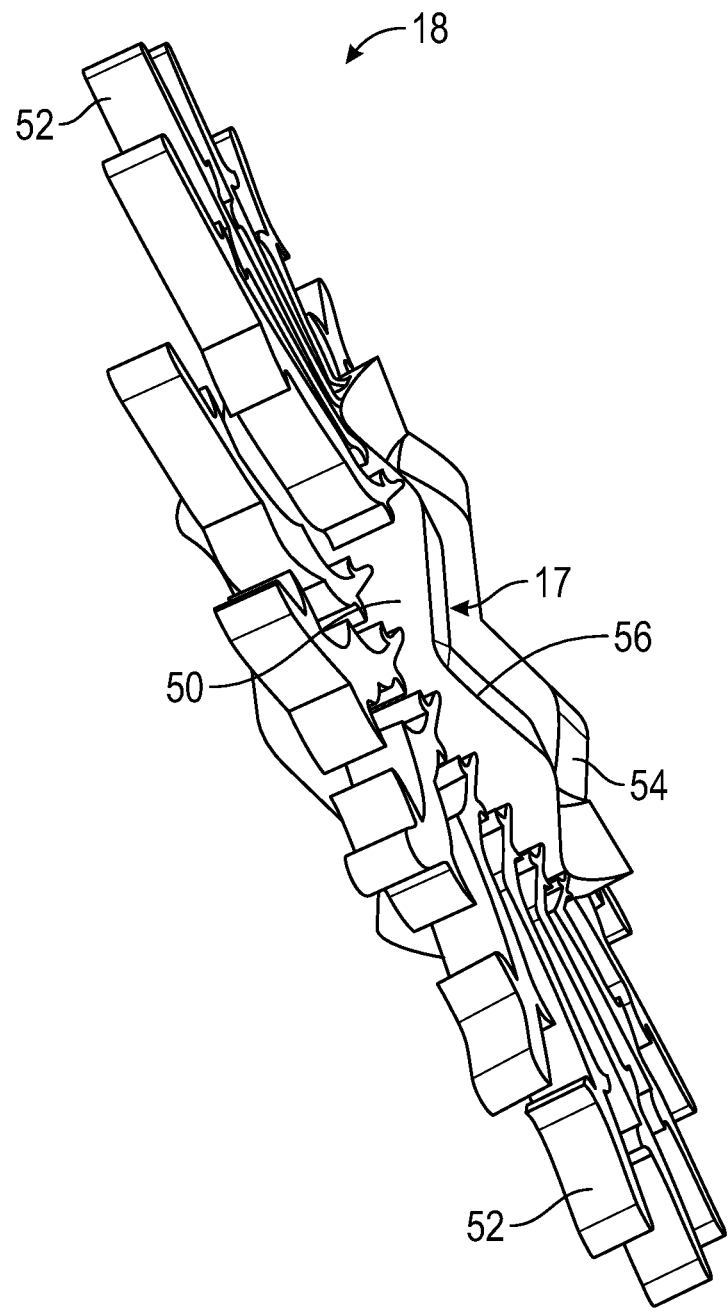
FIG. 19 is a perspective view of a disc bristle element according to an embodiment of the invention.

FIG. 19 illustrates an exemplary configuration of the discs 18. As shown therein, each disc 18 may have a central hub 50 defining the central aperture through which the core section 12 is received. The disc 18 also includes a plurality of tines 52 that project radially outward from the central hub 50. The tines 52 may be generally linear in configuration, or can have a plurality of bends, curves, projections and the like, as shown in FIG. 19. As further shown therein, the hub 50 has a thickness in the axial direction that is greater than the thickness of the tines 52, so that when the discs 18 are received on the core section, the tines 52 of each disc are axially spaced from one another by space 22. In an embodiment, the opposed axially-facing surfaces of the hub 50 may include a plurality of lands 54 and grooves 56 that are configured to engage/interface with corresponding lands and grooves on the hub of an adjacent disc. This configuration functions to essentially couple the entire array of discs together, inhibiting rotational movement of one disc with respect to another disc.

As indicated above, it is contemplated that central aperture 17 of the discs 18 is sized so that the discs 18 are tightly received on the core wire section 12 by the bristles 14, substantially preventing rotational movement of the discs 18 about the core wire section 12. Alternatively, the central aperture may be sized so that the discs 12 are freely rotatable about the core wire section 12. In yet other embodiments, it is contemplated that the bristles 14 may be omitted from the core wire section 14, in which case the that central aperture 17 in the discs 18 may be sized so that the discs 18 are tightly received directly by the core wire section 12, or so that the discs 18 are rotatable and axially movable about the core wire section 12.

The discs 18 may be manufactured to have any configuration or shape desired, to provide a number of desirable functional characteristics, such as picking up and transporting a supply of mascara from a reservoir and depositing it on a user's eyelashes, combing out clumps of excess mascara, and separating lashes so that the mascara may be applied evenly. For example, the shape of the perimeter of the discs 18 may be circular, square, pentagonal, hexagonal, star-shaped, and the like. Also, the perimeter of each disc 18 can be either formed with or without a taper. In other words, each disc can have a uniform thickness throughout the disc, or the thickness of each disc can decrease from the center of the disc towards the perimeter. In an embodiment, one or more of the discs can include radially projecting ribs or tines.

Importantly, as noted above, the individual discs 18, and the specific configuration, shape and/or characteristics thereof form an array that can provide multiple, and often opposed functions. In particular, each different shape contemplated has associated with it different wiping and combing characteristics. The choice of which shape to use will be chosen based on the application characteristics desired. It will be evident that the discs comprising the applicator do not all have to be of the same shape and size, and can be mixed and matched accordingly. As illustrated in FIG. 1, in an embodiment, one or more molded or additively manufactured elements 24 may be positioned on the core wire section 12 between the tip 16 and discs 18. In an embodiment, the element 24 may be tapered to form a smooth transition from the distal-most disc 18 to the distal tip 16.

While FIG. 1 illustrates a brush 10 having bristles 14 retained in the twisted core wire section 12, in some embodiments, the bristles may be omitted such that the brush 10 includes only the core wire section 12 with integral tip 16, and a plurality of stacked discs 18 received on the core wire section. In yet other embodiments, the core wire section 12 may include a single length of wire (i.e., a solid, unitary core) having an integral, homogeneous tip formed on the distal end of the wire. Further, it is contemplated that the core wire section may take any form (i.e., twisted or untwisted) and may be comprised of any number of legs (e.g., one or more). In any of these embodiments, however, the distal tip 16 is, importantly, enlarged with respect to the diameter of the core wire section, and is formed by melting or welding the distal end of the core wire section without adding any material, such that the tip 16 is made, solely, from existing material from the core wire section.

Figure 3:
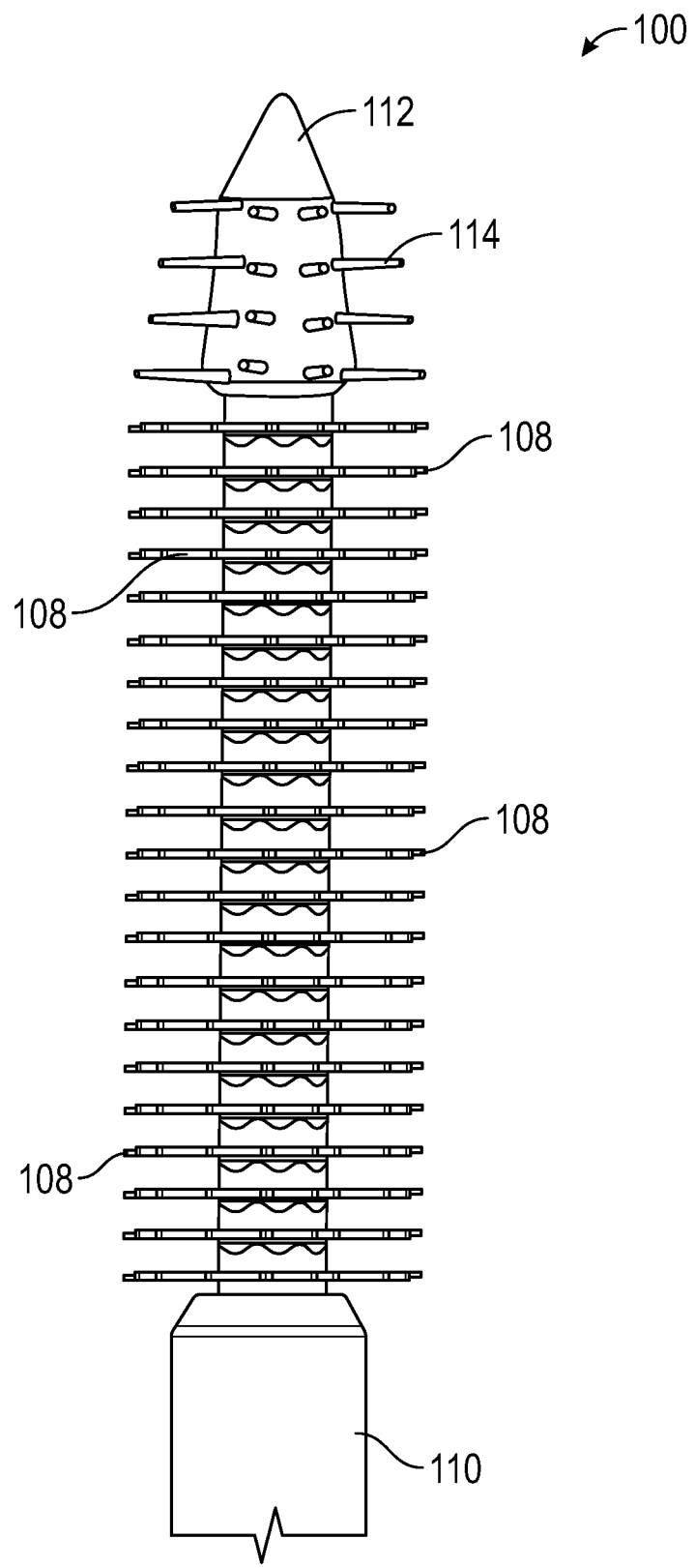
FIG. 3 is a perspective view of a stacked-disc brush according to another embodiment of the present invention.
Figure 4:
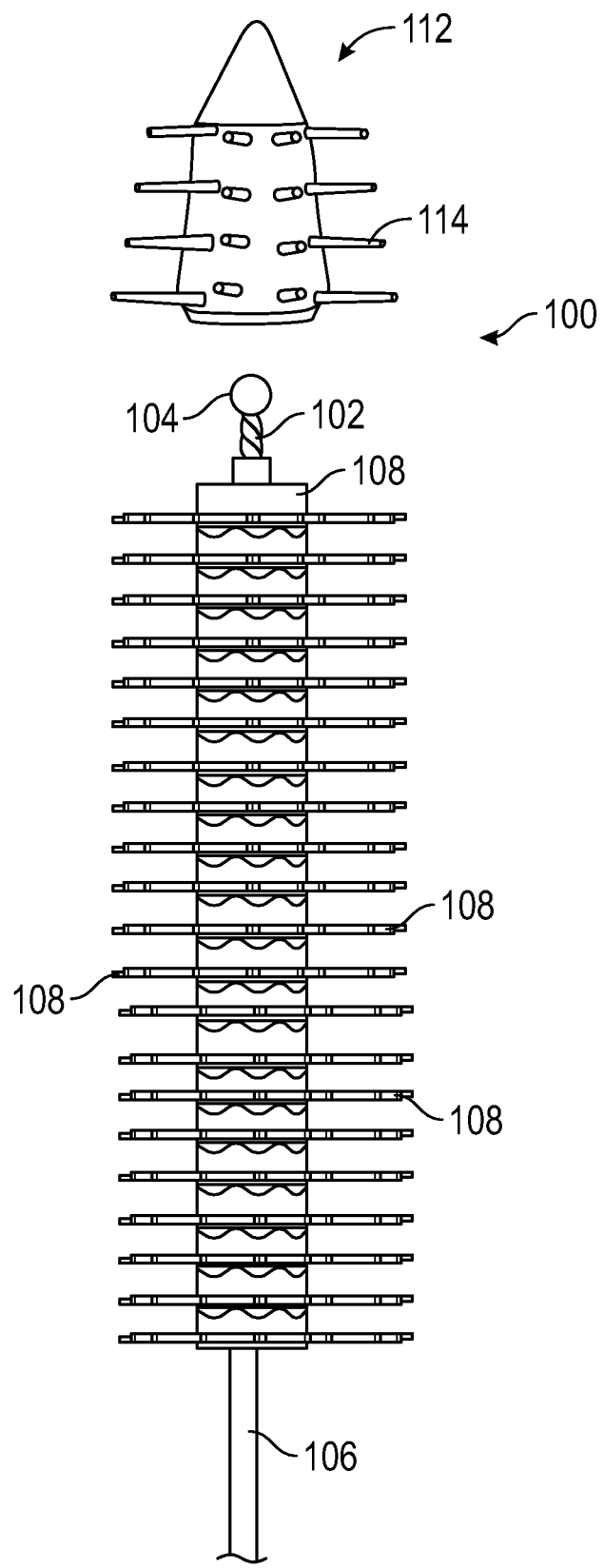
FIG. 4 is a partially exploded view of the brush of FIG. 3.
Figure 5:
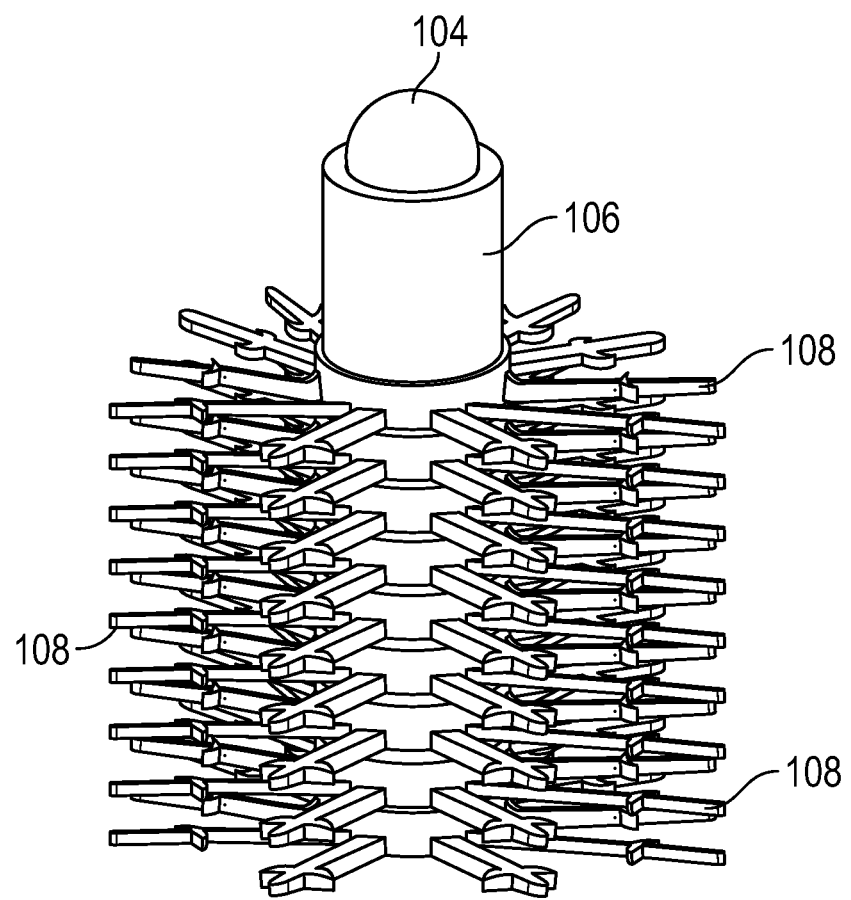
FIG. 5 is an enlarged, detail view of a distal end of the brush of FIG. 3.

Turning now to FIGS. 3-5, a brush 100 according to another embodiment of the present invention is illustrated. The brush 100 is constructed similarly to brush 10 of FIG. 1 and includes a core wire section 102 having two or more leg portions twisted about one another in a helical configuration. The brush 100 further includes a spherical or ball-shaped tip 104 integrally formed at a distal end thereof, made from melting the distal end of the core wire section 102 without the additional of any outside material. In particular, the tip 104 is formed in the manner described above. The brush 100 further includes a molded sleeve 106 having a hollow interior, which is received over the core wire section 102. A plurality of stackable discs 108 are then received over the sleeve 106. As described above in connection with FIG. 1, the tip 104 prevents the discs 108 from sliding off the distal end of the brush 100. As best shown in FIG. 3, a handle 110 may be secured to a proximal end of the brush 102 over the sleeve 108 to prevent the discs 108 from sliding off the proximal end.

As further shown in FIGS. 3 and 4, in an embodiment, a tip 112 having a plurality of tines or radially extending elements 114 may be secured to the distal end of the brush 100. In an embodiment, the tip 112 may be formed using molding or additive manufacturing techniques (e.g., 3D printing). In an embodiment, the tip 112 may be formed with an interior, generally spherically-shaped socket (not shown) that is configured to closely receive the tip 104 of the core wire section 102 therein. In this manner, the tip 112 and core wire section 102 are joined by a ball and socket connection formed by the spherical tip 104 of the core wire section 102 and the socket of the tip 112.

The brush 100 of FIGS. 3-5, therefore, comprises a metallic core wire section and integral tip that is strong and rigid, and which supports and serves as the backbone for the molded or additively manufactured exterior elements including the sleeve 106, stacked disc elements 108, handle 110 and tip 112.

Importantly, it has been discovered that brushes manufactured and constructed in the manner described herein (e.g., shown in the embodiments of FIGS. 1-5) may be trimmed, shaped and deformed using one or more post-assembly processing steps to provide almost any brush shape and configured desired, providing a level of performance and functionality heretofore not possible with existing disc-array applicator brushes. In particular, in an embodiment, once the array of discs are received on the core wire section, the brush head, comprising the array of discs, may be trimmed or cut to a desired shape. For example, the brush head comprising the array of discs may be trimmed to an hour glass shape, a bullet shape, a spheroid shape, a prolate spheroid shape, an ovoid shape, and others.

In one embodiment, trimming of the brush head may be accomplished using existing machinery utilized for trimming traditional fiber brushes. For example, trimming may be carried out using a live knife or a dead knife, and using either horizontal or vertical trimmers. For example, once the array of molded discs are received on the core wire section of the brush, the brush is mounted to a rotating fixture or hub, which rotates the brush at high speed about its axis. A trimming knife may then be moved radially and axially (longitudinally) with respect to the axis of rotation of the brush head to trim or shape the discs to a desired shape. To form a bullet shape, for example, the brush is rotated about its longitudinal axis and a trimming knife or blade may be positioned into close association with a proximal end of the brush head. The knife is then moved axially (longitudinally) from the proximal end of the brush head to the distal end of the brush head (adjacent to the distal tip of the brush). As the knife is moved longitudinally towards the distal tip, the knife is progressively moved closer, in a radial direction, toward the core wire section of the brush. This results in a brush head having a wider cross-sectional area at a proximal end thereof, and a smaller cross-sectional area adjacent to the distal tip (i.e. forming a tapered or bullet shape). Alternatively, the brush may be held stationary while a rotating cutting knife or apparatus is moved radially and axially with respect to the brush head. In this manner, the discs comprising the brush head may be trimmed in a manner similar to traditional fiber brushes, which has heretofore not been possible with existing stacked-disc brushes.

In addition to trimming the discs to form a variety of brush head shapes, the core wire section of the brush may be bent or deformed into various shapes or with various bends, curves, angles, etc. In an embodiment, shaping or deforming the core wire section may be accomplished using existing machinery utilized for shaping or imparting contours to traditional fiber brushes. For example, once the array of discs are assembled onto the wire core, and any post-assembly trimming steps are carried out to shape the brush head, the brush may be placed into a fixture or apparatus having one or more forming dies. The forming dies are utilized to impart one or more bends, shapes or contours to the core wire section of the brush. In an embodiment, the core wire section may be bent to an angle between about 0 degrees and 90 degrees, for example. While it is contemplated that the bending or shaping of the core wire section is carried out after any trimming of the brush head, in some embodiments, the core wire section may be bent or shaped prior to trimming.

Figure 8:
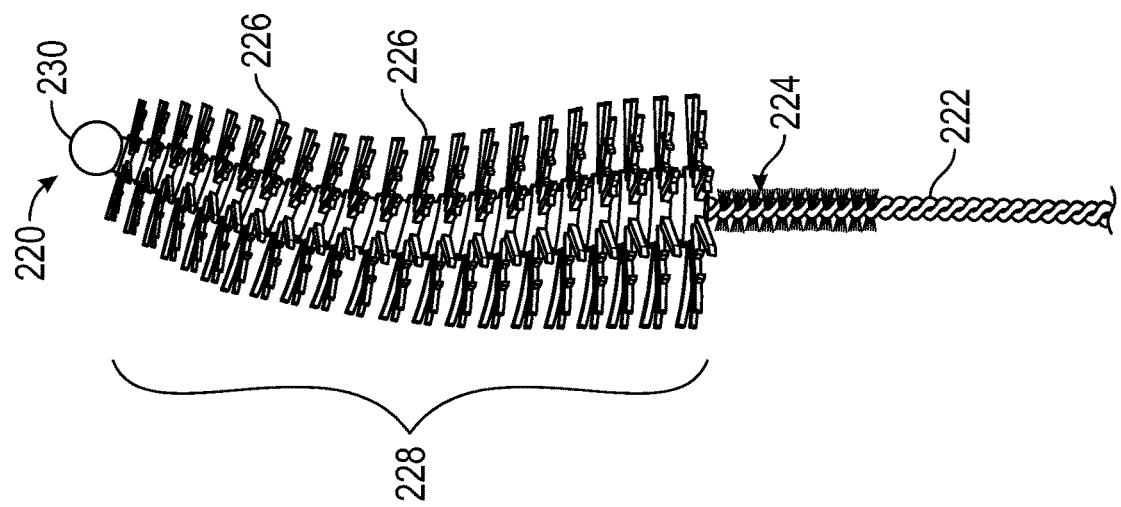
FIG. 8 is a perspective view of a brush manufactured according to embodiments of the present invention, shown with disc elements trimmed to a bullet shape and the wire core bent to a desired curvature.
Figure 7:
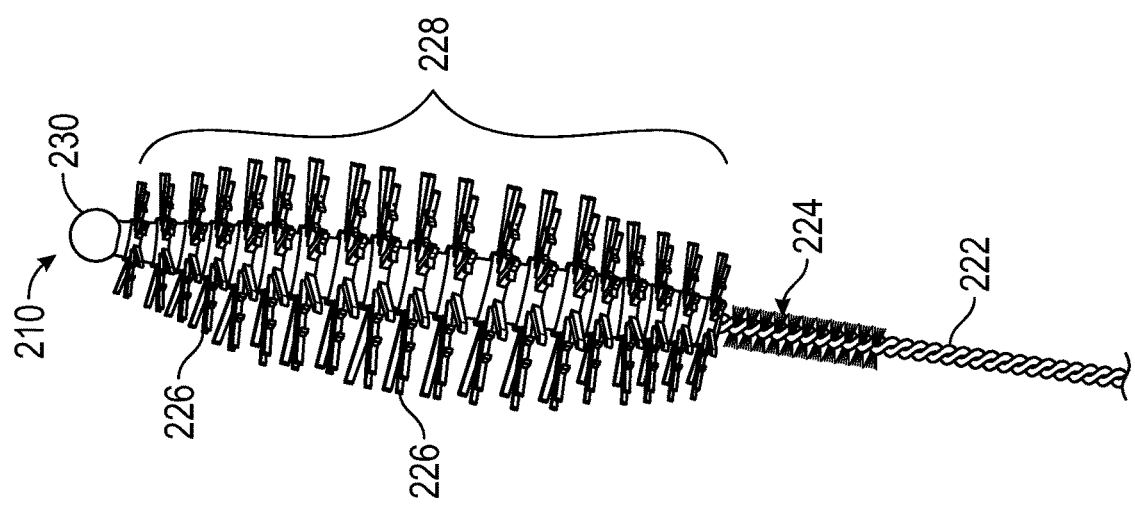
FIG. 7 is a perspective view of a brush manufactured according to embodiments of the present invention, shown with disc elements trimmed to a prolate spheroid shape.
Figure 6:
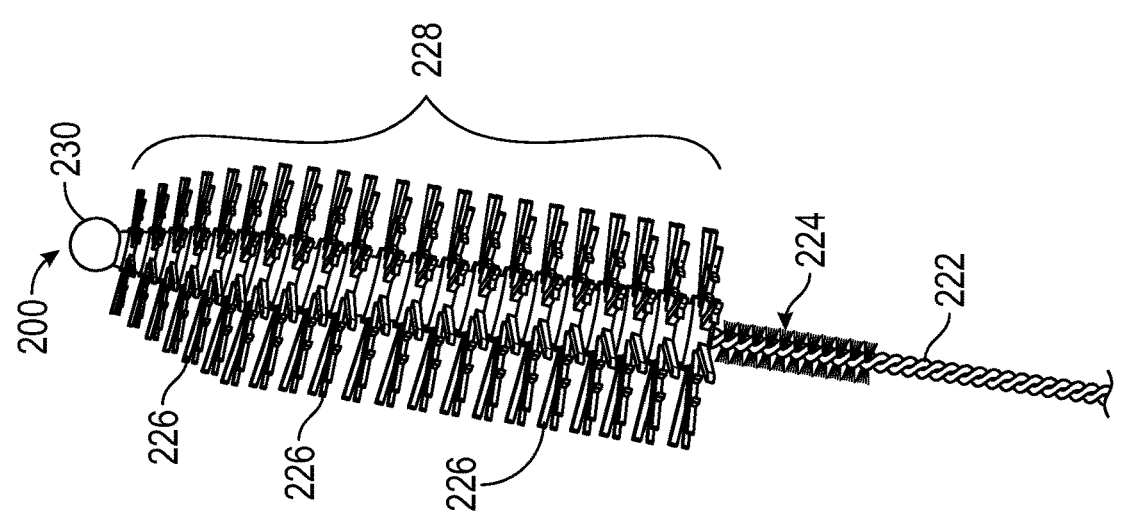
FIG. 6 is a perspective view of a brush manufactured according to embodiments of the present invention, shown with disc elements trimmed to a bullet shape.
Figure 12:
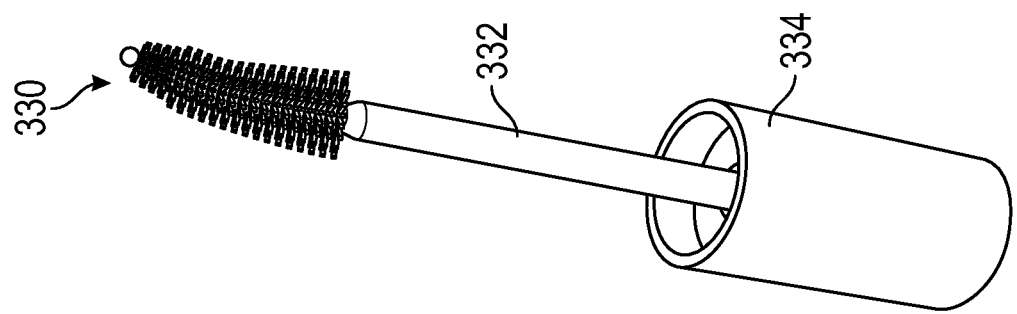
FIG. 12 is a perspective view of another cosmetic brush manufactured according to embodiments of the present invention.
Figure 11:
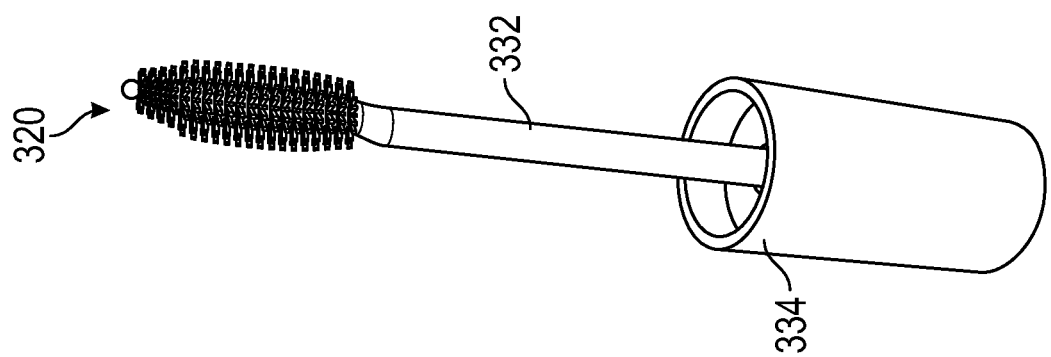
FIG. 11 is a perspective view of another cosmetic brush manufactured according to embodiments of the present invention.
Figure 10:
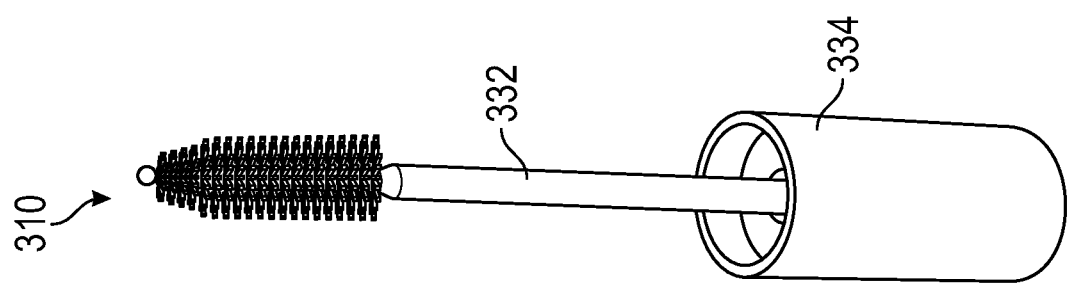
FIG. 10 is a perspective view of another cosmetic brush manufactured according to embodiments of the present invention.
Figure 9:
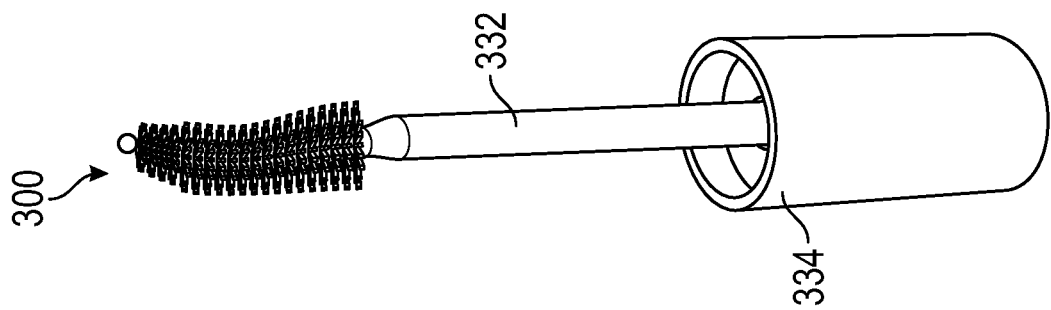
FIG. 9 is a perspective view of a cosmetic brush manufactured according to embodiments of the present invention.

The present invention therefore provides a brush having a metallic core wire section which may be made up of a single length or wire, or multiple lengths of wire twisted about one another, and a plurality of molded or additively-manufactured, preferably plastic or elastomeric disc members, received on the core wire section in a stacked array. The brush head is contoured, shaped and/or trimmed to provide an almost unlimited array of possible brush head shapes, angles and configurations. With reference to FIGS. 6-8, various brushes 200, 210, 220 that can be manufactured according to the embodiments described herein are shown (although many other configurations are also possible). Each of these brushes 200, 210, 220 has a core wire section 222 made up of two metallic leg members twisted about one another in a helical configuration. As indicated above, however, in some embodiments, the core wire section may be a single length of metallic wire. The brushes 200, 210, 220 each contain a plurality of fiber bristles 224 that are anchored in the core wire section in the manner described above, although such bristles may optionally be omitted. In addition, the brushes 200, 210, 220 includes a plurality of molded discs 226 that are received on the core wire section 222 in stacked relationship and form a brush head 228. The discs 226 are retained on the wire core by a distal tip 230, which may be for example, an integral tip formed by melting or welding a portion of the core wire section, as described above.

As illustrated in FIG. 6, the brush head 228 of brush 200 (specifically, the discs 226 thereof) may be trimmed to form a bullet shape brush head. As shown in FIG. 7, the brush head 228 of brush 210 may trimmed to form a prolate spheroid shape brush head. Other head shapes can also be formed in a similar manner. In addition, after trimming the brush head 228 to shape, the core wire section 222 may be bent, shaped, contoured or deformed. One example of a brush formed using the post-assembly steps of trimming and shaping is shown in FIG. 8. As illustrated therein, the brush head 228 is trimmed to a bullet or tapered shape, and then the core wire section 222 (through the extent of the brush head 228) is bent to form a curve. As indicated above, the core wire section may be bent to almost any configuration, curve or angle desired.

FIGS. 9-12 illustrate fully-assembled stacked-disc brushes 300, 310, 320, 330 manufactured using the techniques disclosed herein. As shown therein, the proximal end of the core wire section of each brush is received in a molded handle or stem 332 that may be attached to a cap 334 so as to be particularly suited for use in applying personal care products such as mascara. Various modifications may be made to the brush head, and to the proximal end of the brush depending on the particular end use and/or functional properties desired.

Figure 15:
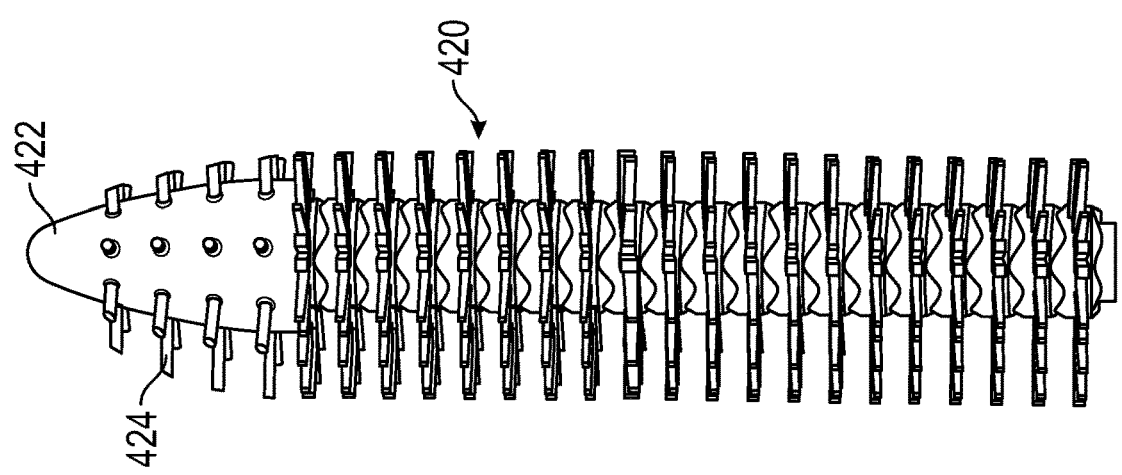
FIG. 15 is a side elevational view of a brush head having a power slide shape, which can be achieved the manufacturing methods of the present application.
Figure 14:
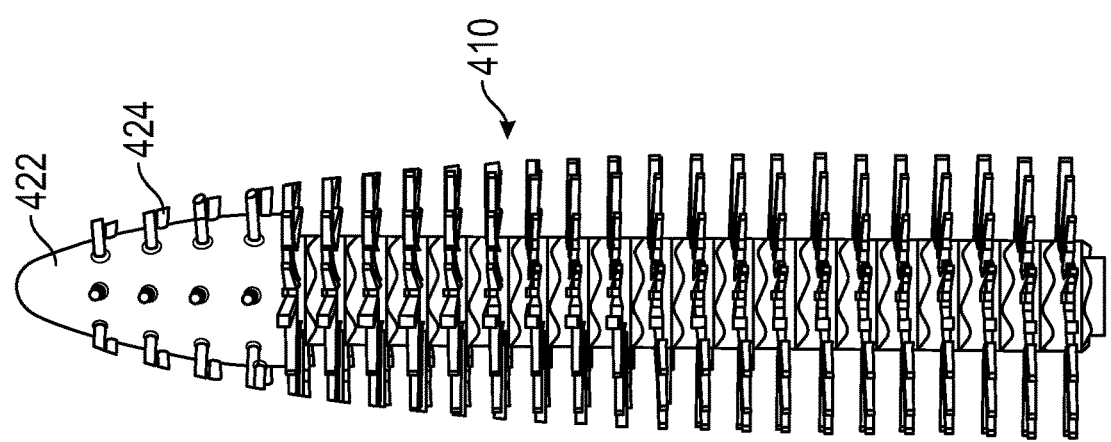
FIG. 14 is a side elevational view of a brush head having a bullet shape, which can be achieved the manufacturing methods of the present application.
Figure 13:
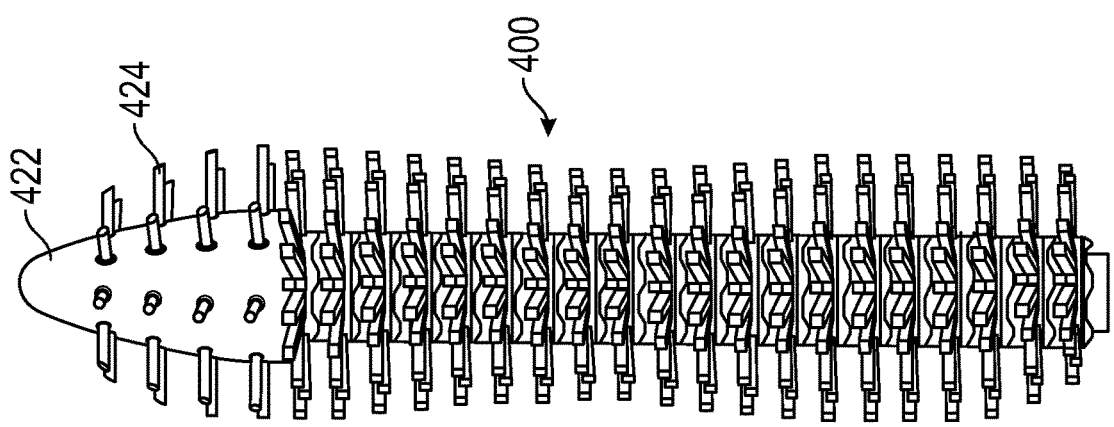
FIG. 13 is a side elevational view of a brush head having an hourglass shape, which can be achieved the manufacturing methods of the present application.

FIGS. 13-15 illustrate various brush head shapes that may be formed utilizing the techniques described herein. For example, FIG. 13 illustrates how the stacked disc array 400 on the core wire section can be trimmed to form an hour glass shape, while FIG. 14 illustrates how the stacked disc array 410 on the core wire section can be trimmed to form a bullet shape, and FIG. 15 illustrates how the stacked disc array 420 on the core wire section can be trimmed to form a power slide brush head configuration. As also shown in FIGS. 13-15, a molded or additively-formed tip 422 having radial extending bristles 424 may be secured to the distal end of the brush (such as with a ball-and-socket connection using the integral tip of the brush, as described above). The bristles 424 may similarly be trimmed to any desired shape using the techniques described herein (at the same time or at a different time than the trimming of the brush head).

In yet other embodiments, the core wire section may be received within a sleeve, similar to the embodiment shown in FIG. 3. Such a brush may still be deformed and trimmed in the manner described herein. In such embodiments, the molded sleeve is preferably formed from a resilient or elastomeric material so as to permit deformation during the shaping process, without breaking or fracturing. Importantly, the core wire section within the sleeve provides structural rigidity so as maintain the post-deformation shape of the brush.

Importantly, therefore, the relatively rigid, but deformable, core wire section of the brush allows for bending and shaping of the brush assembly. In stark contrast to existing stacked-disc brushes which utilize plastic brush stems, the core wire section of the brush of the present invention will not break during bending or forming and, importantly, will retain its shape once bent or deformed. In addition, the helical configuration of the core wire section and/or the presence of the fiber bristles in the core wire section, holds the stacked discs in substantially fixed position, allowing the brush head (and discs thereof) to be trimmed using conventional means. These shaping and trimming processes have simply not been possible with existing stacked disc brushes.

Figure 16:
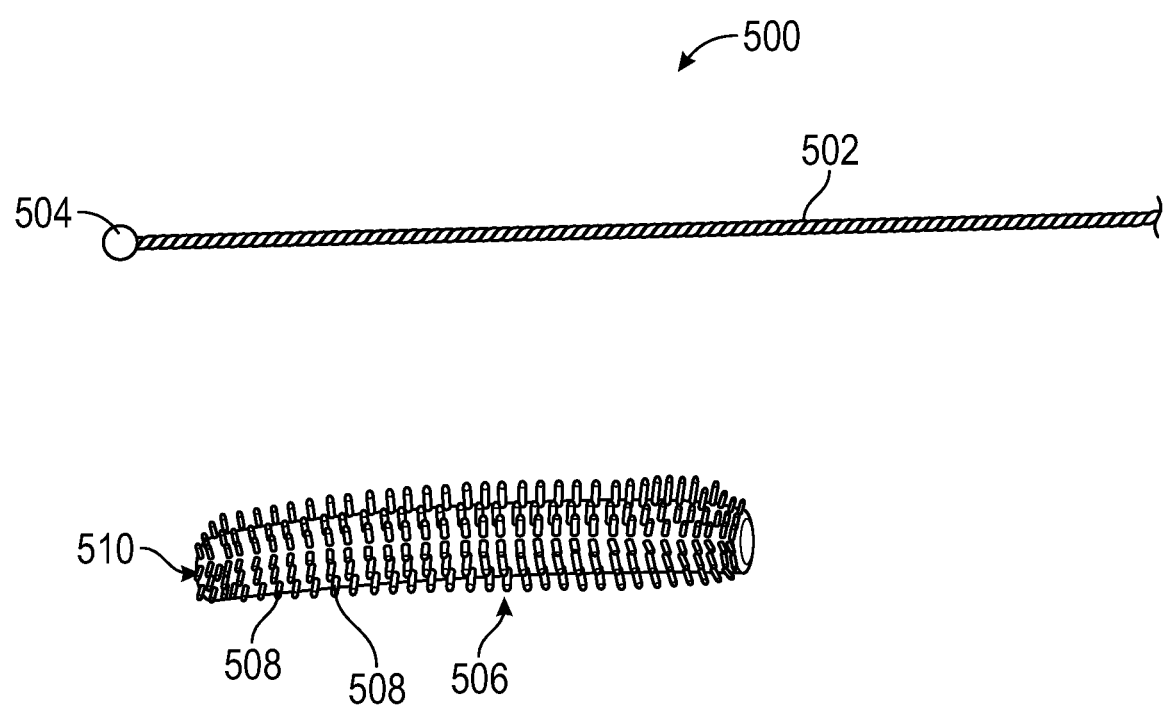
FIG. 16 is a perspective view of the components of a brush assembly according to another embodiment of the present invention.
Figure 17:
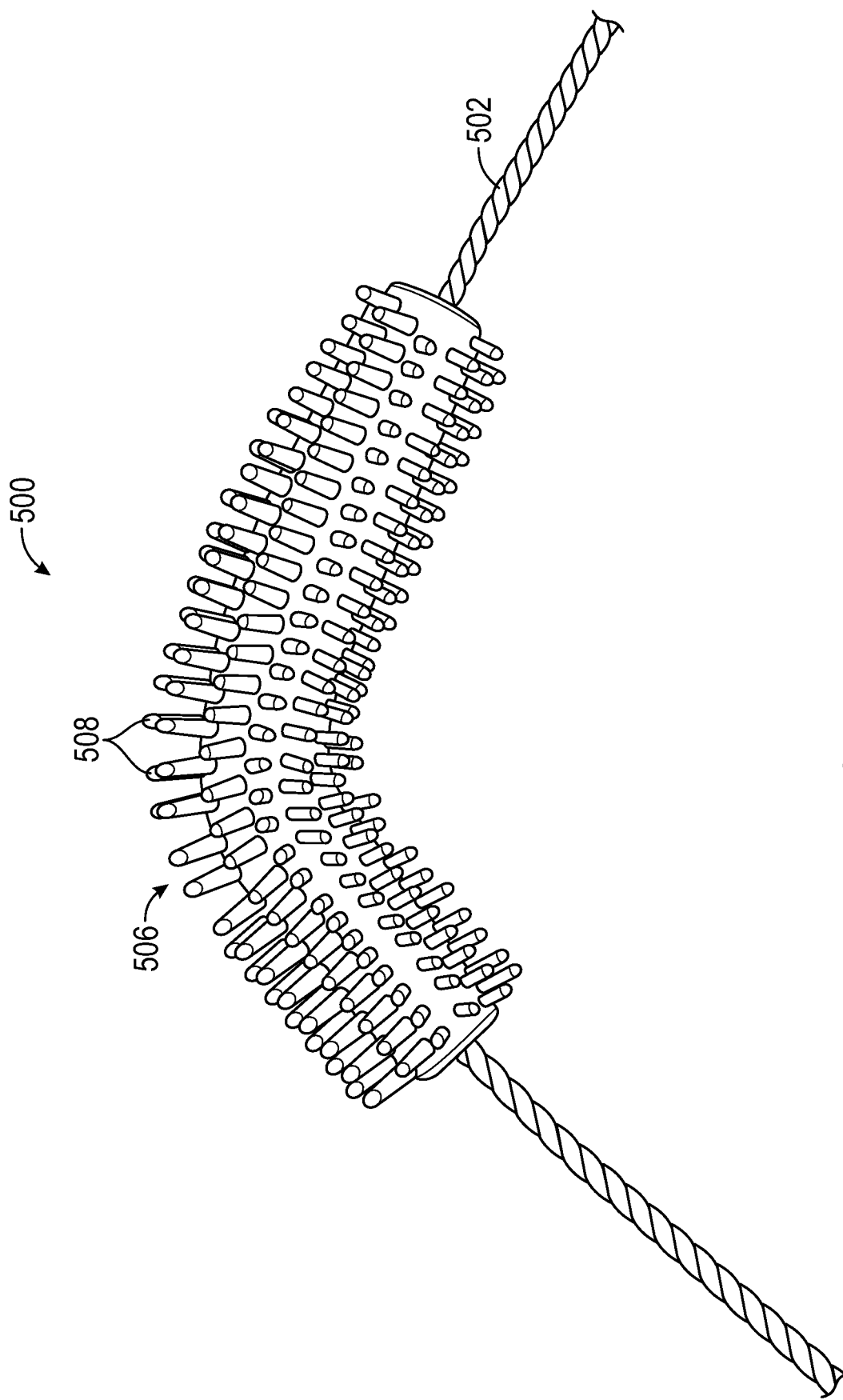
FIG. 17 is a perspective view of the brush assembly of FIG. 16, showing the twisted wire core section of the brush assembly in a bent configuration.
Figure 18:
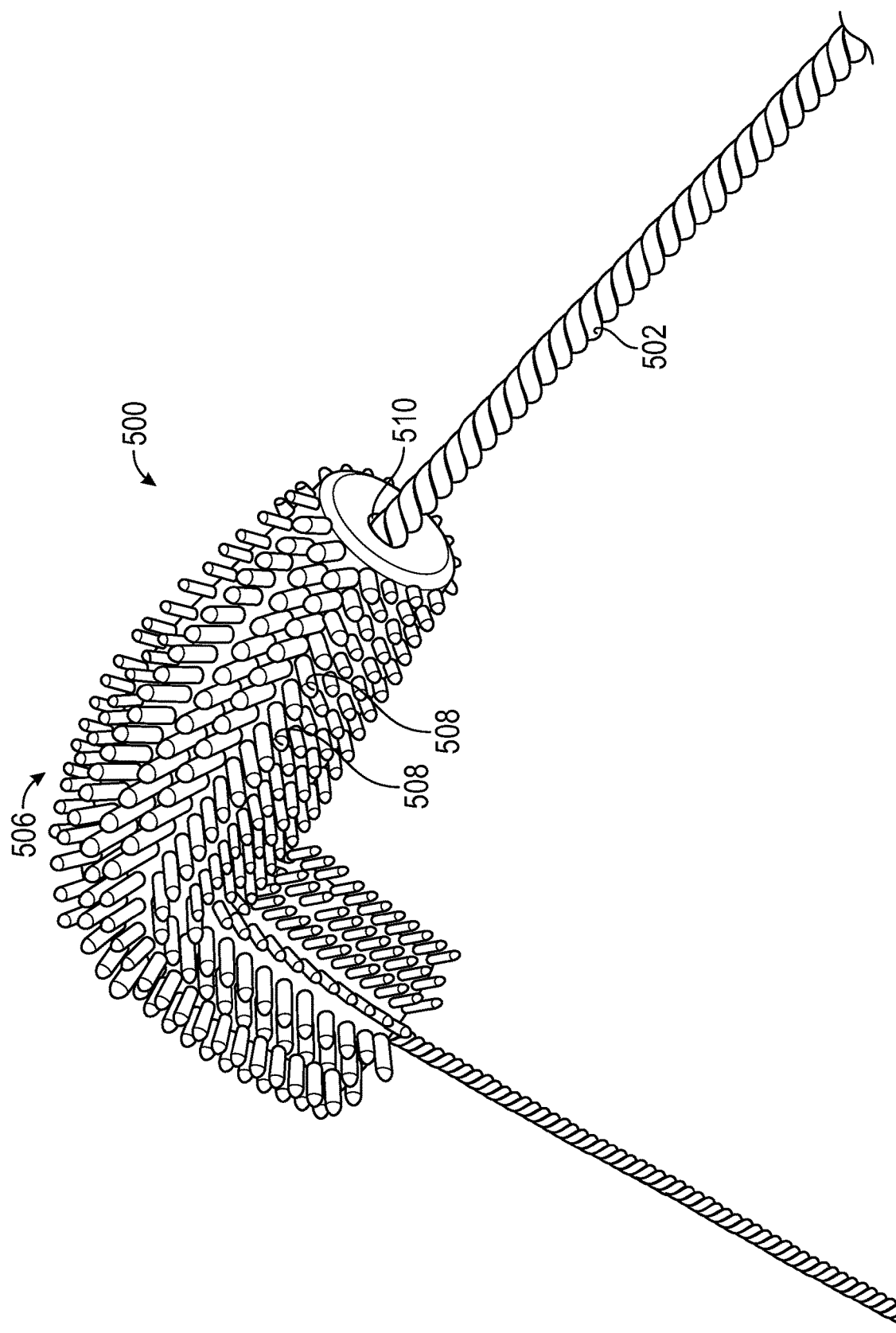
FIG. 18 is another perspective view of the brush assembly of FIG. 16, showing the twisted wire core section of the brush assembly in a bent configuration.

Turning to FIGS. 16-18, a brush 500 according to yet another embodiment of the invention is illustrated. A shown therein, the brush 500 includes a core wire section 502 formed in the manner discussed above, namely, having two or more leg portions twisted about one another in a helical configuration. The brush 500 further includes a spherical or ball-shaped tip 504 integrally formed at a distal end thereof, made from melting the distal end of the core wire section 502 without the additional of any outside material. In particular, the tip 504 may be formed in the manner described above, i.e., by melting or welding the distal end of the core wire section, without the addition of any extraneous material. In some embodiments, the core wire section may have a plurality of radially extending bristles anchored in the core wire section, as discussed above. In other embodiments, the bristles may not be present.

The brush 500 further includes a bristle section or bristle block 506 having a plurality of discrete bristle elements 508 protruding therefrom. In an embodiment, the bristle block 506 has a central throughbore or passageway 510 extending from a proximal end to a distal end thereof. In an embodiment, the bristle block 506 is formed using 3D printing or additive manufacturing. For example, the bristle block 506 may be manufactured from a resin using additive manufacturing, so as to produce a resilient or elastomeric bristle block 506. Importantly, using 3D printing or additive manufacturing allows for an almost infinite variety of bristle configurations to be produced (e.g., bristle density, bristle spacing, bristle thickness, etc.) rather quickly and easily. In other embodiments, the bristle block 506 may be a molded element similar to the discs of the embodiments described above.

With reference to FIGS. 17 and 18, the bristle block 506 is slidably received on the core wire section 502, where the integral tip 504 functions as a position stop, preventing the bristle block 506 from sliding off the distal end of the core wire section 502. In an embodiment, the diameter of the throughbore 510 is approximately equal to or greater than a diameter of the core wire section 502, but less than the diameter of the integral tip 504. After manufacturing the core wire section 502 and bristle block 506 in separate processes, the bristle block 506 may be slid onto the core wire section 502 from the proximal end (which may not have an enlarged, integral tip) toward the distal end with the tip 504. In other embodiments, the bristle block 506 may be inserted over the enlarged tip 504, which is enabled by the bristle block 506 being formed from a resilient material.

Similar to the embodiments described above, after assembly of the bristle block 506 onto the core wire section 502, various post-assembly processes may be utilized to form or shape the brush 500. For example, the core wire section 502 may be bent, shaped, contoured or deformed, as illustrated in FIGS. 17 and 18. Importantly, the elasticity or resiliency of the bristle block 506 facilitates bending of the core wire section without compromising the integrity of the bristle block 506. The resiliency of the bristle block 506 also allows the bristle block 506 to closely conform to whatever shape or configuration in which the core wire section 502 is placed. It is further contemplated that in some embodiments, the bristle elements 508 may be cut or trimmed to a desired shape.

While the brush assemblies disclosed herein may be particularly suited for uses in applying personal care product compositions such as mascara, the present invention is not so limited in this regard. In particular, it is contemplated that the techniques described herein may be utilized to manufacture brushes for a variety of uses including, but not limited to, cleaning the interior surfaces of vessels and tubular bodies and collecting biological specimens or samples. Moreover, while the embodiments described herein disclose trimming the array of discs of the brush head to form a desired shape, in some embodiments, the individual discs themselves may be performed to a specific shape so that when assembled in stacked-relationship on the core wire section, the brush head forms the desired shape (i.e., without the need to trim the discs).

According to an embodiment of the present invention, a brush includes a core section having a proximal end and a distal end, and an integral tip formed on the distal end, and at least one bristle element slidably received on the core section. In an embodiment, the integral tip forms a position stop preventing the at least one bristle element from sliding off the distal end of the core section. In an embodiment, the core section includes at least two leg members twisted about one another in a helical configuration. In an embodiment, the integral tip is generally spherical in shape. In an embodiment, the integral tip has a diameter that is greater than a diameter of the core section. In an embodiment, the integral tip and the core section are homogeneous. In an embodiment, the core section is formed form a metal or metal alloy. In an embodiment, the at least one bristle elements is a plurality of discs defining a brush head. In an embodiment, the core section includes a plurality of leg portions twisted in a helical configuration, and a plurality of fiber bristles anchored between the plurality of leg portions. The plurality of discs are received about the plurality of fiber bristles such that the plurality of fiber bristles inhibit rotational and axial movement of the plurality of fiber bristles with respect to the core section. In an embodiment, the brush head is shaped by at least one of bending a portion of the core section and/or trimming the plurality of discs. In an embodiment, the at least one bristle element is an additively manufactured or molded bristle element having a plurality of bristles. In an embodiment, the bristle block is shaped by bending a portion of the core section.

According to another embodiment of the invention, a method of manufacturing a brush includes the steps of providing a core section having a proximal end and a distal end, and an integral tip on the distal end, and positioning at least one bristle element on the core section, the at least one bristle element having a throughbore through which the core section extends. The integral tip forms a position stop preventing the at least one bristle element from sliding off the distal end of the core section. In an embodiment, the at least one bristle element is additively manufactured or molded. In an embodiment, the core section includes a plurality of leg portions twisted in a helical configuration, wherein the at least one bristle element is a plurality of disc elements. In an embodiment, the core section includes a plurality of bristles anchored between the plurality of leg portions, wherein the plurality of bristles inhibit axial and rotational movement of the plurality of disc elements on the core section. In an embodiment, the method also includes imparting a bend or curve to the core section after positioning the at least one bristle element on the core section. In an embodiment, the method includes trimming the at least one bristle element after positioning the at least one bristle element on the core section.

According to another embodiment of the present invention, a brush includes a core section having a plurality of leg portions twisted in a helical configuration, and a plurality of fiber bristles anchored between the plurality of leg portions, and a plurality of disc elements received on the core section. The plurality of fiber bristles are configured such that the plurality of fiber bristles interact with the plurality of disc elements to inhibit rotation of the plurality of disc elements relative to the core section. In an embodiment, the brush also includes an integral tip formed on a distal end the core section, the integral tip having a diameter that is greater than a diameter of an aperture of each of the plurality of disc elements through which the core section is received, such that the integral tip forms a position stop preventing the plurality of disc elements from sliding off the distal end of the core section.

According to yet another embodiment of the present invention, a brush includes a core wire section having a proximal end and a distal end, and a plurality of discs received on the core wire section, the plurality of discs defining a brush head. The brush head is shaped by at least one of trimming the plurality of discs of the brush head and/or bending a portion of the core wire section. In an embodiment, the brush head is shaped by trimming the plurality of discs, and the brush head has one of a bullet shape, an hourglass shape, a prolate spheroid shape and a power slide shape. In an embodiment, the brush head is shaped by bending a portion of the core section at an angle. In an embodiment, the angle is between about 0 degrees and about 90 degrees. In an embodiment, the plurality of discs are formed from a polymer or elastomeric material. In an embodiment, the brush also includes an integral tip formed on the distal end, wherein the integral tip forms as a position stop preventing the plurality of discs from sliding off the distal end of the core section. In an embodiment, the core section includes at least two leg members twisted about one another in a helical configuration. In an embodiment, the brush also includes a plurality of bristles extending from the core section. In an embodiment, the integral tip is generally spherical in shape. In an embodiment, the integral tip has a diameter that is greater than a diameter of the core section. In an embodiment, the integral tip and the core section are homogeneous. In an embodiment, the core section is formed from a metal or metal alloy.

According to yet another embodiment of the present invention, a method of manufacturing a brush includes the steps of providing a core section having a proximal end and a distal end, positioning at least one bristle element on the core section, and at least one of trimming the at least one bristle element to shape after positioning the at least one bristle element on the core section and/or bending the core section after positioning the at least one bristle element on the core section. In an embodiment, the at least one bristle element is a plurality of discs, the plurality of discs forming a brush head. In an embodiment, the plurality of discs are trimmed to one of an hourglass shape, a bullet shape, a prolate spheroid shape and a power slide shape. In an embodiment, the core section is bent to an angle between about 0 degrees and about 90 degrees. In an embodiment, the core section includes a plurality of leg portions twisted in a helical configuration, and a plurality of fiber bristles anchored between the plurality of leg portions. In an embodiment, the core section includes an enlarged, distal tip. In an embodiment, the at least one bristle element is formed via an additive manufacturing process.

According to yet another embodiment of the present invention, a method of manufacturing a brush includes the steps of providing a core section having a proximal end and a distal end, positioning a plurality of disc elements on the core section in stacked relationship, and at least one of bending the core section after positioning the plurality of disc elements on the core section and trimming at least a subset of the plurality of disc elements after positioning the plurality of disc elements on the core section. In an embodiment, the core section includes a plurality of leg portions twisted in a helical configuration, and an enlarged, distal tip forming a position stop preventing the plurality of disc elements from sliding off the distal end of the core section.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A brush, comprising:
  a core section including at least two leg members twisted about one another in a helical configuration, the core section having a proximal end and a distal end, and a tip formed on the distal end, the tip being enlarged such that a diameter of the tip is greater than a diameter of the core section;
  a plurality of discs received on the core section, the plurality of discs extending axially along the core section to define a brush head, each disc including a hub body with an aperture formed therethrough to encompass a portion of the core section and a plurality of spaced tines extending radially from the hub body; and
  a distal tip received on the enlarged tip of the core section via a ball-and-socket connection,
  wherein upon placement of the distal tip on the enlarged tip of the core section, the hub body of a disc of the plurality of discs that is closest to the enlarged tip is disposed in the ball-and-socket connection and covered thereover by the distal tip.

2. The brush of claim 1, wherein:
  the tip of the core section forms a position stop preventing the plurality of discs from sliding off the distal end of the core section.

3. The brush of claim 1, wherein:
  the tip of the core section is generally spherical in shape.

4. The brush of claim 1, wherein:
  the tip of the core section and the core section are homogeneous.

5. The brush of claim 1, wherein:
  the core section is formed form a metal or metal alloy.

6. The brush of claim 1, wherein:
  the core section further includes a plurality of fiber bristles anchored between the at least two leg members;
  wherein the plurality of discs are received about the plurality of fiber bristles such that the plurality of fiber bristles inhibit rotational and axial movement of the plurality of fiber bristles with respect to the core section.

7. The brush of claim 6, wherein:
  the brush head is shaped by at least one of bending a portion of the core section and/or trimming the plurality of discs.

8. The brush of claim 1, wherein:
  the plurality of discs are additively manufactured or molded elements having a plurality of bristles.

9. The brush of claim 1, wherein:
  the brush head is shaped by bending a portion of the core section.

10. The brush of claim 1, wherein:
  each of the plurality of discs has an axially-facing surface having a plurality of peaks and valley configured to interface with the peaks and valleys of an adjacent disc of the plurality of discs, the plurality of peaks and valleys of each disc being arranged in an annular configuration around a central aperture of each disc.

11. The brush of claim 1, further comprising a spacer element received on the core section between the disc of the plurality of discs that is closest to the enlarged tip of the core section.

12. A method of manufacturing a brush, comprising the steps of:
  providing a core section having a plurality of leg portions twisted in a helical configuration, a proximal end and a distal end, and a tip on the distal end;
  positioning a plurality of disc elements on the core section, the plurality of disc elements each having a throughbore through which the core section extends; and
  trimming the plurality of disc elements after positioning the plurality of disc elements on the core section in the stacked arrangement;
  wherein the tip forms a position stop preventing the plurality of disc elements from sliding off the distal end of the core section;
  wherein the core section includes a plurality of bristles anchored between the plurality of leg portions;
  wherein the plurality of bristles inhibit axial and rotational movement of the plurality of disc elements on the core section.

13. The method according to claim 12, further comprising the step of:
  imparting a bend or curve to the core section after positioning the plurality of disc elements on the core section.

* * * * *